Nov. 5, 1929.  G. B. WILLIAMS ET AL  1,734,660
METALLIC FLOORING OR GRATING
Filed Nov. 19, 1927  2 Sheets-Sheet 1

*Inventors:*
*George Brailey Williams &*
*William James Hamilton Porter.*
*per: Sydney E. Vage.*
*Attorney.*

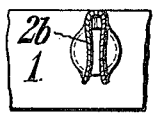
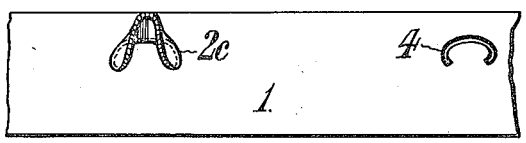
FIG. 8.  FIG. 9.
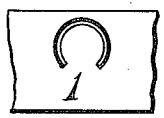 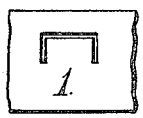 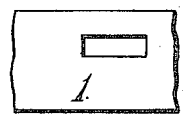
FIG. 10.  FIG. 12.  FIG. 13.
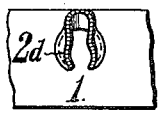 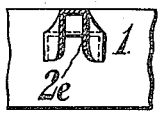 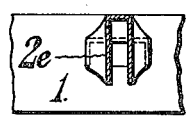
FIG. 11.  FIG. 14.  FIG. 15.
 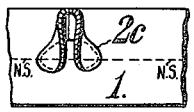 
FIG. 17.  FIG. 18.  FIG. 16.
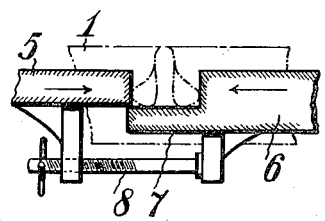
FIG. 19.
Inventors:
George Brailey Williams &
William James Hamilton Porter.
pa: Sydney E. Page.
Attorney.

Patented Nov. 5, 1929

1,734,660

UNITED STATES PATENT OFFICE

GEORGE BRAILEY WILLIAMS, OF CARDIFF, AND WILLIAM JAMES HAMILTON PORTER, OF PENYLAN, CARDIFF, WALES, ASSIGNORS TO NEW ENGINEERING CONSTRUCTION COMPANY, LIMITED, OF LONDON, ENGLAND

METALLIC FLOORING OR GRATING

Application filed November 19, 1927, Serial No. 234,469, and in Great Britain July 30, 1927.

This invention relates to the manufacture of metal flooring and other load carrying constructions including intersecting metal members, and further to a method of making such flooring.

A main object of the present invention is to construct openwork flooring in which the obstruction to the passage of light is a minimum.

A further object is to produce a rigid structure, that is to say, an unbending structure so that if a corner of a section from which the structure is built up, or a corner of a unit floor, is lifted from the horizontal, the rest of the section or unit remains in one plane containing the said corner and correspondingly inclined to the horizontal.

Another object is to construct metallic flooring in which the perforated members are weakened to the least possible extent, thereby making them efficient load carrying members.

Another object is to construct the perforated members so that there is a constant strength throughout their length.

Another object is to construct a metal flooring which may be cut in any direction to fit up to obstacles such as pipes passing through the flooring.

A further object is to produce a metallic gridwork of pleasing appearance yet possessing strength in the manner above indicated.

Another object is to construct a metallic flooring in such a manner that the erection may take place on the site where the flooring is to be constructed, thereby saving transport cost of bulky section or unit, and another object is to construct a gridwork of intersecting metallic members in which relative movement of any of the members one to another is absolutely prevented, thereby eliminating chattering noises emanating from the vibration of machinery.

According to the present invention a metal flooring comprises a series of perforated members and a series of hollow threaded members passed through the apertures of the perforated members, characterized by the fact that the perforated and threaded members are locked together to form a substantially integral whole by compressing the threaded members so as to force out protuberances immediately adjacent each side of the perforated member to produce an interlock.

The hollow threaded members are preferably of tubular form, though rods or bars may be employed, but drawn or otherwise manufactured members of C or channel form, or what might be referred to as split tubes may be employed.

The threaded members conveniently may be formed of oval, D or other curved or polygonal section so that they cannot rotate within perforations of the other co-operating members, thereby it is easy to compress to a form presenting sufficient abutment on each side of the perforation to positively oppose lateral movement of the perforated member, but in order that a minimum weakening of the perforated member shall obtain, the threaded members are preferably of flat section so that the maximum diameters of the perforations are disposed longitudinally of the perforated members. However, in order that the perforated members may have a constant strength throughout their length protuberances may be formed juxtaposed to each perforation to replace the metal removed to form the perforations.

Reference will now be made to the accompanying drawings which show by way of example some preferred constructions embodying the present invention.

Figure 3:
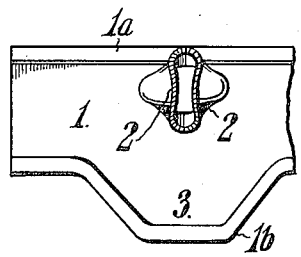
Fig. 3 is a detail elevation taken on the line III—III of Fig. 2.
Figure 3A:
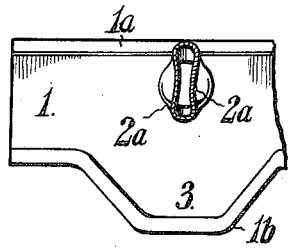
Figure 5:
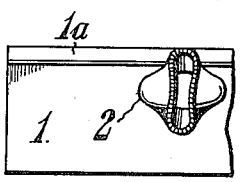
Fig. 5 is a detail elevation taken on the line V—V of Fig. 4.
Figure 5A:
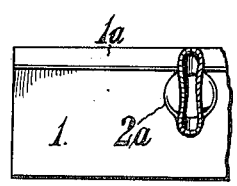
Figure 7:
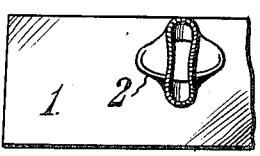
Fig. 7 is a detail elevation taken on the line VII—VII of Fig. 6.
Figure 7A:
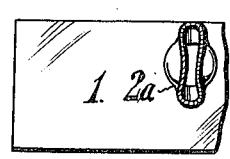

Figs. 3ª, 5ª and 7ª are views similar to Figs. 3, 5 and 7 respectively, showing the use of a cylindrical threaded member;

Figs. 8 to 18 are fragmental views of a longitudinal member in which various modifications are shown of perforating the aforesaid member for various forms of threaded members. Each of the aforesaid figures are particularly referred to hereafter;

Fig. 19 shows diagrammatically a pressing apparatus for producing a distortion in tubular members according to the present invention.

Figure 1:
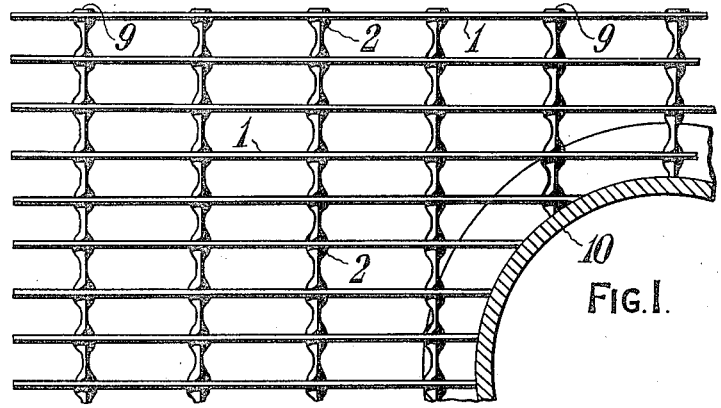
Fig. 1 is a plan view of a grating made according to the present invention, the right hand lower corner being cut away to show how the grating may be cut to fit about an obstruction passing through the flooring in the form of a pipe.
Figure 2:
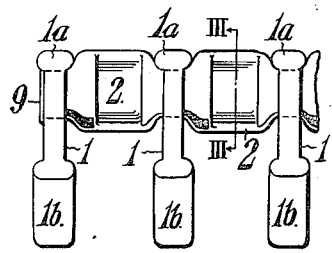
Fig. 2 is a detail view showing in end elevation and to an enlarged scale the grating shown in Fig. 1.

Considering first Figs. 1–3 and the formation of a flooring which may be in sections or of continuous nature, the flooring will usually include steel girders and floor beams and on such skeleton framework the openwork grating, constructed according to the present invention, will be laid. The openwork grating includes longitudinal and transverse members indicated at 1 and 2 respectively, the longitudinal members being perforated with holes for the reception of the transverse members 2 which are threaded through them, the transverse members being elliptical tubes.

As clearly shown in the figures, the tubes are compressed so as to produce protuberances immediately at each side of the longitudinal members 1, thereby at each and every intersection an indefinite joint is formed between the tubular and longitudinal members, the jointing of the members of the grating being thereby effected without the use of rivets.

The perforated members are formed with a bulb head 1ª, for instance, they may be formed of bulb iron, against which head the distortions of the threaded member are made to intimately engage as clearly shown in Fig. 2, and to give strength to the structure the longitudinal members 1 include also a bulb formation indicated at 1ᵇ, that is to say, the members 1 are of dumb-bell section and to give a constant strength to the longitudinal members throughout their length protuberances 3, see Figs. 2 and 3, are formed below the area to be perforated in order to replace metal for metal removed when making the perforations.

Figure 4:
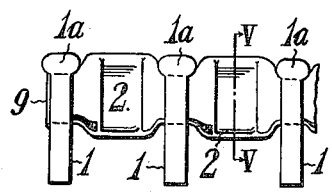
Fig. 4 is a view similar to Fig. 2 of a modified form of grating.
Figure 6:
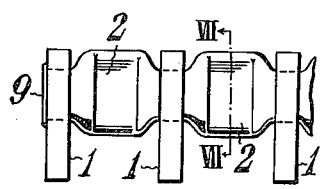
Fig. 6 shows a still further modified form for the grating shown in Fig. 1.

The bulb formation indicated at 1ᵇ and/or the protuberances 3 may be omitted from the construction as shown in Figs. 4 and 5, or alternately, the longitudinal members 1 may be of simple rectangular section as shown in Figs. 6 and 7.

The constructions referred to may be further modified by substituting for the elliptical tubes half elliptical or D tubes preferably with the flat side downwards. Further, circular tubes as indicated at 2ª in Figs. 3ª, 5ª, and 7ª respectively, may be employed, and instead of utilizing tubes properly so called of circular section, split tubes may be used as indicated at 2ᵇ in Fig. 8, the nature of the distortion of which is clearly indicated in that figure.

In the formation of a flooring where tubes of circular section are employed, the number of intersections and distortions produce such a frictional engagement of the threaded members with the perforated members as to tend to prevent a rotary movement of the threaded members. Any such tendency is however definitely prevented by the employment of bulb heads 1ª and by distorting the threaded members until intimate engagement is obtained.

In compressing the tubular members to produce the required distortion a drawing of the threaded members may occur within the perforations thereby producing certain looseness at the joint. Any rocking, however, would be definitely avoided by the use of the bulb heads 1ª aforesaid. In the case of elliptical tubes or other tubes of non-rotatable section the bulb heads 1ª provide in fact a double lock against rotary movement of the threaded members.

Where cylindrical tubes are utilized it is preferable that they should substantially fit the apertures through which they are threaded in order to obtain the maximum frictional engagement.

A still further modification in the constructions described may consist in the use of a threaded member of channel form instead of a tube properly so called, for instance, instead of the elliptical tube 2 a channel tube 2ᶜ having a cross section of part of an ellipse may be employed, as indicated in Fig. 9, and when such form of threaded member is employed slits or slots having the configuration of the channel member are employed instead of holes. In Fig. 9 the left hand end shows the channel member compressed after being threaded through the slit aperture in the longitudinal member 1, and at the right hand end of Fig. 9 a slit aperture is identified by the reference 4.

The non-rotative attribute for the threaded member 2 is inherent in the construction involving a channel member as just described, and in view of the lesser amount of metal removed a correspondingly stronger perforated member is obtained as compared with a member perforated with holes of the same shape as the threaded member so that there is no metal within a tubular threaded member.

A similar result is also obtained if a channel like tubular member of C form is employed, the longitudinal member 1 being provided with a slit or slot like the letter C, as shown in Fig. 10, and a channel member of C shape being threaded through, as indicated at $2^d$ and distorted by compression as shown in Fig. 11.

The use of threaded members of elliptical or cylindrical formation, as hereinbefore described, in every case will result in the formation of a grating having the shape or configuration shown in Fig. 1.

If channel members of rectangular section are utilized the longitudinal member 1 may either be slotted as indicated in Fig. 12 or perforated with a hole as shown in Fig. 13, and a channel member $2^e$ threaded therethrough, as shown in Figs. 14 and 15 respectively, and as regards the construction shown in Figs. 13 and 15 a stronger grille or grating will be obtained if rectangular tubes are threaded through the apertures instead of tubes of channel section. A rectangular tube threaded through such aperture and distorted by compression is indicated at $2^f$ in Fig. 16.

In the construction of load carrying members such as metal flooring where it is of essence to retain the original strength as far as possible of the perforated bars, the perforations through which the threaded members are passed may, instead of being nearer the top than the bottom of the bar, be in the neutral surface thereof, as the removal of metal from the neutral axis or neutral surface of a load carrying member has a lesser weakening effect than if removed from any other part of that member, and the minimum weakening of such load carrying member will be the formation of a semi-elliptical slot $4^a$ symmetrically formed about a neutral axis, as clearly indicated in Fig. 17 wherein the neutral surface is indicated by the reference NS. Through a slot having the shape of part of an ellipse a channel tube $2^c$ of similar section is threaded and distorted as shown in Fig. 18.

The distortion of the threaded members may be effected by the use of plungers 5, 6, Fig. 19, which will engage each end of the major axis of the tube, if of the "flat" e. g. elliptical form, simultaneously, one of the members e. g. 6, being formed with an extension 7 to engage the elliptical member on the lower extremity of the minor axis, thereby assuring a distortion which results in the formation of a tube extending only upwardly from the neutral surface. As indicated at 8 adjusting means may be included for automatically regulating the amount of distortion. Similar tools may be used when the perforation is not in the neutral axis, but in such cases it is not to assure the flow of the metal above the neutral surface, there then being a symmetrical distortion as shown, e. g. in Figs. 3, 5 and 7.

It will be noted that in the use of an elliptical or other "flat" member that there is a minimum removal of metal from the depth of the bar, the removal being equal to the minor axis so that as regards the strength of the perforated bar as a load supporting member a minimum weakening from the unperforated bar results, consequently as already indicated it is of particular utility to employ an elliptical threaded member in the manufacture of gratings or grids as hereinbefore described, and the use of elliptical members or members of any other flat section results in a gridwork of artistic and pleasant design.

As indicated in the several figures of the drawings herewith, where the threaded member is of elliptical, oval or flat section the perforations are made so that the major axis of the threaded member lies longitudinally of the perforated member, then when the threaded members are distorted by compression the major axis between the longitudinal members is disposed substantially transversely to the co-operating perforated members, that is to say, the major axis has by compression been moved through 90°.

Although in the description herein given it appears that the perforations are of identical form to the threaded members, this is not a necessity; round tubes may be used in slightly oval apertures or apertures of polygonal form in which case the use of bulb iron will preferably be employed to assure the non-rotative attribute of the threaded members.

In accordance with this invention, a section may be formed with terminal strips.

By using tubes as transverse members, and also as the means of riveting the intersecting strip elements of the grating, they function not only as the riveted members, but as distance pieces between each of the longitudinal members.

By forming a flooring of such continuous and integral nature, any load on the flooring is distributed throughout the whole construction, and in the erection of such floorings it is possible to transport to the place where the flooring is to be erected, the necessary elements, and at the place interconnect the members to form the flooring, thereby greatly cheapening the structure by reducing the cost of transport.

In making openwork flooring, the perforated members may be plain strip bars or may be of serpentine form, or the two forms of strip bars may be utilized alternately.

Moreover, the intersecting members may be arranged to obtain a diamond shaped mesh instead of a rectangular mesh as shown in the drawings.

It will be noted also that according to the stresses which are to be taken by a grating it will be determined whether or not it is necessary to distort the whole of a tube or equivalent linking member in between two perforated members, or whether or not the mere connection is sufficient by the local distortion of the threading linking member.

In the manufacture of gratings or grilles, e. g. as shown in plan in Fig. 1, the outside perforated members may be locked to the threaded tubular members by expanding the latter as indicated at 9 in Figs. 1, 2, 4 and 6.

A metal flooring, grating, grille, or the like constructed according to the present invention and comprising a series of parallel straight bars, and a series of straight threaded members passed through the apertures of the perforated members and compressed immediately on each side of each perforation is a structure in which the threaded and perforated members are rigidly connected together to obtain a rigid whole, so that distribution of load results, while at the same time there is a minimum obstruction to the passage of light. As a matter of fact the only obstructions to the light are the actual intersecting members of the grid, and it will be noted that the compression on each side of every intersection produces a rigidity resulting in a structure in which the threaded and perforated members are substantially integral with one another, as the threaded members are held against axial movement or an angular movement about their axes.

Generally speaking, the distortion of the linking member, which is preferably a tube of oval section, will be produced by working it flat or by pressing by hydraulic or other means. In this way no weakening of the linking member is produced.

Owing to the nature of the distortion effected according to the present invention, a return to original shape of the tie linking or threaded member could only be obtained by applying an equivalent compressive strain. It is clear, therefore, that the perforated members may be the transverse members of a flooring and take all the jarring successfully which always occurs by the traffic which passes thereover, that is to say, the perforated members so formed can not move relatively over the threaded members, which, in such cases form longitudinal members. Moreover, a joint made according to the present invention is effected without crystallization of material which results when riveting is employed, and the rigidity of the joint is such that noise due to vibration is avoided, there is in fact a complete interlocking of the threaded and threading members, which, as hereinbefore indicated, results in a structure giving distributed load areas.

Although in the formation of a grating with intersecting bars and tubes as herein described, a non-skid floor surface is in fact produced, it may be preferable to serrate the surfaces of the perforated members or to otherwise roughen them.

Owing to the rigidity of the grids or gratings constructed according to the present invention, parts of the gratings may overhang their supports, and an advantage arising out of the method of jointing the grating elements in accordance with this invention is that the grating may be of any desired shape by merely limiting the lengths of either the tubular or the threaded members which may be cut anywhere as indicated in Fig. 1 to fit up to obstacles such as a pipe 10 passing through the flooring.

The gratings may be made in small sections, but where a large assembly of units to form a flooring of large superficial area the jointing may be effected at the place where the flooring is to be made, thereby affording a saving in cartage expenses arising out of sending large structures ready assembled and of extensive bulk.

What we claim is:—

1. A metallic flooring comprising a series of perforated load carrying members of bulb section and a series of hollow threaded members passed through the apertures of the perforated members, the perforated and threaded members being locked together to form a substantially integral whole by compressing the threaded members immediately on each side of every intersection until they engage the bulb portions of the perforated members so as to prevent movement along or about their axes whereby a load carrying rigid structure is obtained which offers a minimum obstruction to the passage of light.

2. A metallic flooring comprising a series of perforated load carrying members of bulb section and an intersecting series of threaded hollow members, the perforations being of such shape and the threaded members of such section that the latter cannot rotate, the perforated and threaded members being locked together to form a substantially integral whole by compressing the threaded members immediately on each side of every intersection until they engage the bulb portions of the perforated members, thereby forming a double lock against rotation about their own axes and preventing movement therealong.

3. A metallic flooring comprising a series of perforated load carrying members of bulb section and an intersecting series of threaded hollow members, the perforations being of such shape and the threaded members of such section that the latter cannot rotate, the perforated and threaded members being locked together to form a substantially integral whole by compressing the threaded members immediately on each side of every intersection until they engage the bulb portions of the perforated members, thereby forming a double lock against rotation about their own axes and preventing movement therealong, and protuberances on said perforated members juxtaposed to each perforation for the purpose of replacing metal for the metal removed and to give a constant strength to the members throughout their length.

4. A metal flooring comprising in combination a series of parallel straight members of bulb section formed with oval perforations at short intervals and an intersecting series of straight oval tubes threaded through said members and fitting said apertures, said tubes being compressed immediately on each side of every perforation until they engage the bulb portions of the perforated members, whereby a load carrying rigid structure is obtained which offers a minimum obstruction to the passage of light.

5. A metal flooring comprising a series of perforated members and a series of hollow threaded members passed through the apertures of the perforated members, the threaded members being locked together to the perforated members to form a substantially integral whole by being compressed laterally for the full distance between the perforated members with upper portions of the compressed parts being in the same plane as the top of the perforated members.

6. A metal flooring comprising in combination a series of parallel straight load carrying members formed with oval perforations at short intervals and an intersecting series of straight oval tubes threaded through said members and fitting said apertures, the threaded members being locked together to the perforated members to form a substantially integral whole by being compressed laterally for the full distance between the perforated members with upper portions of the compressed parts being in the same plane as the top of the perforated members.

7. A metal flooring comprising in combination a series of parallel straight members of bulb section formed with oval perforations at short intervals and an intersecting series of straight oval tubes threaded through said members and fitting said aperture, said tubes being compressed laterally for the full distance between the perforated members until they engage the bulb portion of the perforated members with upper portions of the compressed parts being in the same plane as the top of the perforated members.

8. A metal flooring comprising a series of parallel load carrying members perforated at intervals along their neutral axes, and a series of hollow members passed through said perforations, the threaded members being locked together to the perforated members to form a substantially integral whole by being compressed laterally for the full distance between the perforated members with upper portions of the compressed parts being in the same plane as the top of the perforated members.

9. A metal flooring comprising a series of parallel load carrying members with oval perforations at intervals along their neutral axes and a series of oval tubes threaded through them, said tubes being compressed laterally for the full distance between the perforated member with upper portions of the compressed parts being in the same plane as the top of the perforated members.

In testimony whereof we affix our signatures.

GEORGE BRAILEY WILLIAMS.
WILLIAM JAMES HAMILTON PORTER.